Patented May 1, 1951

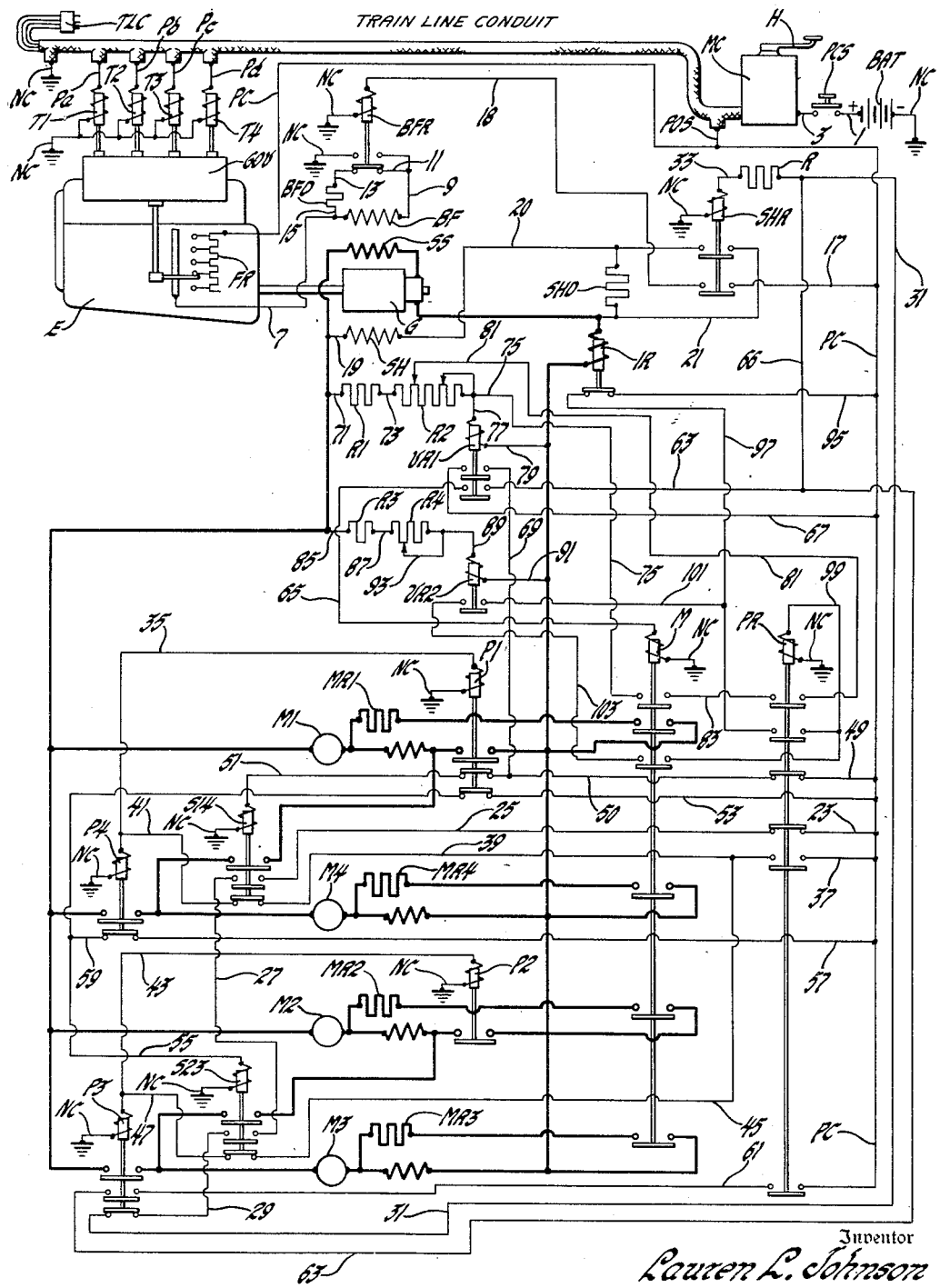

2,551,438

UNITED STATES PATENT OFFICE 2,551,438

GENERATING ELECTRIC TRACTION AND CONTROL SYSTEM

Lauren L. Johnson, Westchester, Ill., assignor to General Motors Corporation, Detroit, Mich., a corporation of Delaware Application February 24, 1950, Serial No. 146,067

7 Claims. (Cl. 290—17)

This invention relates to locomotive generating electric traction and control systems and more particularly to combined manual and automatic control means for varying the speed and tractive effort of the locomotive.

The principal object of the invention is to provide a simple generating electric traction and control system for a locomotive including cooperating manual control means and automatic control means, the automatic means acting in response to electrical conditions in the generator and motor connections upon variations in the speed and load of the locomotive to cause transition of the motor connections and control the power input to the motors so that minimum current and voltage surges occur in the generator and motors thereby preventing large and sudden changes in the motor torque and locomotive tractive effort.

The combined traction control means and interconnections by which this object is accomplished will become apparent by reference to the following detailed description and single accompanying schematic drawing illustrating one form of the invention which is particularly adapted for use on locomotives of the generating electric type.

The generating electric traction means comprises a generating electric power plant including a prime mover E, such as a Diesel engine, an electric traction generator G driven thereby and electric power connections, shown in heavy lines on the drawing, interconnecting the generator with a plurality of series type electric traction motors M1, M2, M3 and M4 and series and parallel contactors S14, S23, P1, P2, P3 and P4 operable for connecting pairs of motors in series and the individual motors in parallel with the generator in a well known manner to establish series-parallel and parallel power circuit relations of the motors with respect to the generator. Motor field shunting resistors MR1, MR2, MR3 and MR4 are provided and each resistor is shown connected in series by power conductors, also shown in heavy lines, with separate normally open sets of power contacts of a motor field shunting contactor M.

The speed, load and power output of the power plant is controlled by a speed responsive governor GOV having speed response setting means T1, T2, T3 and T4. The engine governor is driven by the Diesel engine prime mover E and operates the engine fuel control means, not shown, and the slider of a generator field rheostat FR to control the excitation thereof to maintain constant values of speed, load and output of the engine E and generator G corresponding to operation of the setting of the governor by the speed response setting means T1, T2, T3 and T4 in a well known manner. The windings of the setting means T1, T2, T3 and T4 are energized separately and in various combinations through suitable stationary and manually operated control contacts, not shown, provided in a master controller MC. Each of the governor setting means T1, T2, T3 and T4 is provided with an armature moved upwardly from the position shown when the winding is energized for operating the governor speed response adjusting means of the governor, not shown.

The generator G is provided with a differential series field winding SS, a shunt field winding SH and a battery field winding to control the excitation and output of the generator.

A battery BAT provides the means for energizing the governor setting means T1, T2, T3 and T4, the generator battery field winding BF, the windings of battery and shunt relays BFR and SHR, the winding of a parallel relay PR and the windings of the contactors M, S14, S23, P1, P2, P3 and P4.

Two relays VR1 and VR2 each acting in response to different preselected ranges of generator voltage and a current relay IR acting in response to a preselected value of generator current serve as the automatic control means. Each of the various relays and contactors are provided with an electromagnetic winding energizable to move an armature upwardly from the lower normal drop-out position shown. Each armature is provided with contacts cooperating with certain stationary sets of contacts when in the normal drop-out position, shown, and also cooperating with certain other stationary contacts when the armature is picked up upon energization of the winding from the normal drop-out position.

The connections of the windings and certain of the stationary contacts of the contactors and relays, serving as interlocking and control contacts, are connected in the following manner for combined and sequential operation of the relays and contactors by energizing, train-line control, control and interlocking conductors, shown in lighter lines on the drawing.

A manually closed positive control switch PCS is connected by conductors 1 and 3 in series between the positive terminal of the battery BAT and master controller MC. The negative battery terminal is connected to a negative control conductor NC, which is shown grounded to simplify the drawing. The negative control conductor NC is also connected to the lower winding terminals or certain of the contactors and relays, shown grounded. The negative control conductor NC, shown grounded and entering the train-line conduit at the upper left corner of the drawing, is connected to a negative train-line conductor in the conduit.

The master controller MC is provided with suitable stationary and manually movable contacts, not shown, and when the controller handle H is moved manually from an off position to any of a plurality of operating control positions after manual closure of the positive control switch PCS certain positive train-line control conductors located in the train-line conduit for the various electromagnetic control means are connected to the positive battery. A positive branch conductor POS is shown leading from the train-line conduit and connected to a positive control conductor PC for energization of the windings of the series and parallel contactors S14, S23, P1, P2, P3, and P4 and the battery field winding BF. Other positive branch conductors Pa, Pb, Pc, Pd are shown leading outwardly of the train-line conduit from separate train-line conductors in this conduit to respective upper winding terminals of the electromagnetic governor speed response setting means T1, T2, T3 and T4 to cause energization of these windings separately and in various combinations to cause operation of the power plant at various constant values of speed, load and power output for the traction motors M1 and M2 to vary the speed and tractive effort of the locomotive.

The generator battery field winding BF is connected in series with the terminals of the field rheostat FR and the upper normally open contacts of the battery field relay BFR between the positive control conductors PC and NC by conductors 7 and 9. The lower normally closed contacts of the battery field relay BFR are connected in series with a battery field discharge resistor BFD across the terminals of the generator battery field winding BF by conductors 9, 11, 13, 15 and 7 to cause prompt discharge thereof. The winding of the battery field relay BFR is connected in series with the lower normally open contacts of the shunt field relay SHR across the positive and negative control conductors by conductors 17 and 18.

The generator shunt field winding SH is connected in series with the normally open upper contacts of the shunt field relay SHR across power conductors connected to the opposite terminals of the generator armature terminals by conductors 19, 20 and 21. A shunt field discharge resistor SHD is connected across conductors 20 and 21 to promptly discharge the generator shunt field winding SH. The winding of the shunt field relay SHR is connected in series with a resistor R, the normally closed contacts fourth from the top of a parallel relay PR, the normally open interlocking contacts directly below the power contacts of the series contactors S14 and S23 and the normally closed lower contacts of the parallel contactor P3 across the positive and negative control conductors PC and NC by conductors 23, 25, 27, 29, 31 and 33.

The lower normally closed interlocking contacts of the series contactor S14 and the normally open contacts second from the bottom of the parallel relay PR are connected in series between the positive control conductor PC and a conductor 35 interconnecting the upper winding terminals of the parallel contactors P1 and P4 by conductors 37, 39 and 41 and the lower winding terminals of the contactors P1 and P4 are connected to the negative control conductor NC.

The lower interlocking contacts of the series contactor S23 are connected in series between the conductor 39 and a conductor 43 interconnecting the upper winding terminals of the parallel contactors P2 and P3 by conductors 45 and 47 and the lower winding terminals of the contactors P2 and P3 are connected to the negative control conductor NC.

The winding of the series contactor S14 is connected in series with the normally closed interlocking contacts of the parallel contactor P1, directly below the power contacts, and the normally closed contacts of the parallel relay PR third from the top, between the positive and negative control conductors PC and NC by conductors 49, 50 and 51.

The winding of the series contactor S23 is connected in series with the lower normally closed interlocking contacts of the parallel contactor P1 between the positive and negative control conductors PC and NC by conductors 53 and 55.

The lower normally closed interlocking contacts of the parallel contactor P4 are connected in series between the positive control conductor PC and the conductor 55 by conductors 57 and 59.

The lower normally open contacts of the parallel relay PR, the normally open interlocking contacts of the parallel relay P3 directly below the power contacts, the lower normally open contacts of the voltage relay VR1 and the winding of the contactor M are connected in series between the positive and negative control conductors PC and NC by conductors 61, 63 and 65. A conductor 66 is connected between conductors 63 and 31. The normally open upper contacts of the voltage relay VR1 are connected in series between the positive control conductor PC and the conductor 50 by conductors 67 and 69. The winding of the relay VR1 is connected in series with the terminals of fixed and variable resistors R1 and R2 directly across the generator armature by conductors 71, 73, 75, 77 and 79. The conductor 71 is shown connected to a power conductor leading to one generator armature terminal and the conductor 79 is shown connected to a power conductor leading to the opposite generator armature terminal.

The variable resistor R2 is shown provided with a pair of adjustable taps, one being connected to the conductor 77 which is connected to the conductor 75 and the other tap is connected to a conductor 81. The normally open upper contacts of the motor field shunting contactor M and the parallel relay are connected in series by a conductor 83 between the resistor tap conductors 77 and 81 of the variable resistor R2.

The winding of the other voltage relay VR2 is also connected in series by conductors 85, 87, 89 and 91 with the terminals of fixed and variable resistors R3 and R4 between power conductors connected to opposite terminals of the generator armature by conductors 85, 87, 89 and 91. The variable resistor R4 is shown provided with an adjustable tap connected by a conductor 93 to the conductor 89.

The winding of the current relay IR is connected in series with power conductors leading to one generator armature terminal. The normally closed contacts of the current relay IR and the normally open contacts of the parallel relay PR, second from the top, and the winding of the relay PR are connected in series between the positive and negative control conductors by conductors 95, 97 and 99. The normally open contacts of the voltage relay VR2 and the normally open contacts of the contactor M, third from the top, are connected in series between the conductors 97 and 99 by conductors 101 and 103.

The train-line conductors are shown connected to a multipole train-line connector TLC for connection with a similar connector connecting the train-line conductors and control means of other locomotive units for multiple control by any locomotive master controller MC in a manner which will now be described.

The operation of the above described traction and control system for a single locomotive unit and any other units connected thereto by the train-line conductors and connectors TLC is as follows:

Manual closure of the positive control switch PCS and movement of the handle H of the master controller to an operating position with the engine idling connects certain of the train-line conductors and the branch train-line conductors POS, Pa, Pb, Pc and Pd leading therefrom to the positive control conductor PC and certain of the windings of the governor speed response setting means to the positive battery terminal through conductors 1 and 3. This causes energization of certain of the windings of the governor speed response setting means and pickup of the armatures thereof and energization of the windings and pickup of the armatures of the series field contactors. Energization of the speed response setting means takes place through certain of the positive train-line branch conductors Pa, Pb, Pc and Pd and the negative control conductor NC. Energization of the winding of the series contactor S14 takes place through conductors PC, 49, 50, 51 and NC and energization of the winding of the series contactor S23 takes place through conductors PC, 53, 55 and NC. Pickup of the armatures of the series contactors S14 and S23 causes closure of the upper power contacts and the interlocking contacts directly below the power contacts. Closure of the power contacts of the series contactor S14 connects the traction motors M1 and M4 in series across the generator G and closure of the power contacts of the series contactor S23 connects the motors M2 and M3 in series across the generator to establish the series-parallel motor circuit relation with the generator. Closure of the interlocking contacts directly below the power contacts of the series contactor S14 and S23 causes energization of the winding and pickup of the armature of the shunt field relay SHR causing closure of its upper and lower contacts. Energization of the winding of the relay SHR takes place through conductors PC, 23, 25, 27, 29, 31, and through the resistor R and conductors 33 and NC Closure of the upper contacts of the shunt field relay SHR shunts the shunt field discharge resistor SHD by means of conductors 29 and 21 and closure of the lower contacts of this relay causes energization of the winding of the battery field relay BFR through conductors PC, 17, 19 and NC to cause pickup of the armature and the opening of the lower and closure of the upper contacts of the battery field relay BFR. Opening of the lower contacts of the relay BFR opens the shunt connection of the generator battery field discharge resistor BFD with the generator battery field winding BF. Closure of the upper contacts of the relay BFR causes energization of the generator battery field winding through the field rheostat FR and conductors PC, 7, 9 and NC. As the generator shunt and battery field windings SH and BF are now excited and the traction motors M1, M2, M3 and M4 are connected in series-parallel relation with the generator G the generator differential field will also be excited and as the governor GOV acts to increase the speed, load and output of the generator to the traction motors to a constant value, depending upon the governor setting by the master controller MC, the motors will start accelerating the locomotive and train coupled thereto.

When the speed of the motors and locomotive increases, the motor back voltage and generator voltage will rise and the generator and motor current will decrease. When the voltage rises to a preselected value sufficient to cause energization of the winding of the relay VR1 through resistors R1 and R2 and conductors 71, 73, 77 and 79 the armature of the relay VR1 is picked up. This causes upward transition of the traction motor connections from the series-parallel to the series-parallel-shunt relation with respect to the generator and continued acceleration of the locomotive. Pickup of the armature of the relay VR1 causes closure of the upper and lower relay contacts. Closure of the upper relay contacts establishes a holding circuit to the winding of the series contactor S14 through the normally closed interlocking contacts of the parallel contactor P1, directly below the power contacts, and through the conductors PC, 67, 69, 50, 51 and NC. Closure of the lower contacts of the relay VR1 causes energization of the winding and pickup of the armature of the motor field shunting relay M. Energization of this winding takes place through the above mentioned and now closed interlocking contacts of the series contactors S14 and S23, the normally closed lower interlocking contacts of the parallel relay P3 and one set of the onrmally closed contacts of the parallel relay PR and conductors PC, 61, 63, 65 and NC. When the armature of the field shunting contactor M picks up all the power contacts close to connect each of the motor field shunting resistors MR1, MR2, MR3 and MR4 across a respective motor series field winding to reduce the motor excitation and back voltage and allow the motors to continue to accelerate the locomotive with the motors now connected in series-parallel-shunt relation with the generator with the motor fields shunted by the field shunting resistors.

Upward transition of the motor connections between the series-parallel-shunt and the parallel connection arrangement takes place upon a further rise in the motor and locomotive speed which causes an increase in the motor and generator voltage and a decrease in the generator and motor current and torque. Upon a further rise in the generator voltage to a preselected higher value the winding of the second voltage relay VR2 will be energized through the resistors R3 and R4 and conductors 85, 87, 89, 91 and 93 by the generator G and its armature will be picked up to cause closure of the contacts of the relay VR2. This causes energization of the winding and pickup of the armature of the parallel relay PR and closure of the two upper and the two lower sets of contacts and the opening of the other two intermediate sets of contacts thereof.

Energization of the winding of the parallel relay PR, upon closure of the contacts of the relay VR2, takes place through the normally closed contacts of the current relay IR, the now closed contacts of the motor field shunting contactor M, third from the top, and conductors PC, 95, 97, 101, 103, 99 and NC and a holding circuit to the winding of the relay PR is also established upon closure of the set of contacts thereof, second from the top, through conductors 97, 99 and NC. Opening of the contacts, third from the top, of the parallel relay PR, through which the winding of the series contactor S14 was initially energized does not cause drop-out of the armature of this contactor as the holding circuit, mentioned above, is kept closed to the contactor winding through the now closed upper contacts of the voltage relay VR1. Opening of the contacts of the parallel relay PR, fourth from the top, opens the circuit to the winding of the shunt field relay SHR through the now closed interlocking contacts of the series contactors S14 and S23, directly below the now closed power contacts thereof maintaining the motors in the series-parallel power circuit relation, and also through the normally closed lower interlocking contacts of the parallel relay P3. This causes drop-out of the armature of the shunt field contactor SHR and the opening of both pairs of contacts. Opening of the upper pair of contacts of the shunt field relay SHR shunting the shunt field discharge resistor SHD in shunt relation with the generator shunt field winding starts prompt discharge of this field winding. The simultaneous opening of the lower contacts of the shunt field relay SHR opens the circuit to the winding of the battery field relay BFR and its armature drops out causing the opening of the upper pair of contacts and closure of the lower contacts. The opening of the upper contacts of the relay BFR opens the generator battery field circuit BF and the closure of the lower relay contacts causes the battery field discharge resistor BFD to be shunted across the battery field winding to also start prompt discharge of this field winding. Prompt discharge of both the generator battery and shunt field windings SH and BF causes a prompt reduction in the generator voltage and output to the motors. This causes drop-out of the armature of the voltage relay VR2 shortly after it picked up to cause pickup of the parallel relay armature which is held in this position by the holding circuit, mentioned above, to the winding of the parallel relay PR. The armature of the voltage VR1 drop out shortly after drop-out of the armature of the voltage relay VR2 due to this prompt reduction in generator voltage causing the opening of both sets of contacts of the relay VR1. Opening of the lower contacts of the relay VR1 deenergizes the winding of the motor field shunting contactor M and its armature drops out to open the shunt connections of the motor field shunting resistors MR1, MR2, MR3 and MR4 and the motor back voltage increases to increase the current in the generator armature and differential field windings SS in order to further reduce the generator output to the motors. Opening of the upper contacts of the relay VR1 opens the holding circuit, mentioned above, to the winding of the series contactor S14 and its armature drops out. This causes energization of the windings and pickup of the armatures of the parallel relays P1 and P4 and also causes deenergization of the winding and drop-out of the armature of the series contactor S23 to cause energization of the windings and pickup of the armatures of the parallel relays P2 and P3 after this prompt reduction in the generator voltage and output occurs. The windings of the parallel relays P1 and P4 are energized through the now closed contacts of the parallel relay PR, second from the bottom, the normally closed lower interlocking contacts of the series contactor S14 and conductors PC, 37, 39, 41, 35 and NC and the windings of the parallel contactors P2 and P3 are energized through the same contacts of the parallel relay PR and the normally closed lower interlocking contacts of the series relay S23 and conductors 39, 45, 47, 43 and NC.

Pickup of the armatures of the parallel contactors P1, P2, P3 and P4 causes closure of the power contacts thereof to now connect each motor across the generator and establish the parallel motor connection. It will be noted that upon closure of the interlocking contacts of the parallel relay P3, directly below the power contacts, an energization circuit is reestablished through these interlocking contacts and the now closed lower contacts of the parallel relay PR to the winding of the shunt field relay SHR through conductors PC, 61, 63, 66, the resistor R and conductors 33 and NC. This causes the armature of the shunt field relay SHR to be picked up again which likewise causes pickup of the armature of the battery field relay BFR and the generator shunt and battery field windings SH and BF are again excited, in previously described manner. This causes power to again be applied to the traction motors M1, M2, M3 and M4, now connected in parallel circuit relation with the generator G, and further acceleration of the motors.

It will be noted that the above described upward transition of the motor connections from the series-parallel-shunt to the parallel connection arrangement was started upon drop-out of the voltage relay VR1 at a lower value of generator voltage than that causing drop-out of the voltage relay VR2, which started discharge of the generator shunt and battery field windings in order to limit current surges in the motor and generator to very low values. This limits torque surges on the locomotive to very low values and accordingly provides smooth transition with very little shock on the locomotive and train coupled thereto.

Upon a further rise in the motor and locomotive speed with the motors connected in parallel with the generator the generator voltage will again rise to a value causing the voltage relay VR1 to again pick up and cause forward transition of the motor connections between the parallel and a parallel-shunt relation for high speed operation of the locomotive. Pickup of the armature of the relay VR1 again causes energization of the winding and pickup of the armature of the motor field shunting contactor M to again connect the motor field shunting resistors MR1, MR2, MR3 and MR4 across the motor series field windings in the same manner as previously described and establish the parallel-shunt motor connection.

Pickup of the armature of the contactor M with the armature of the parallel relay PR also picked up also causes shunting of that portion of the resistor R2 between the taps provided thereon through the now closed upper contacts of this contactor and relay and conductors 75, 77, 83 and 81. This increases the current in the winding of the voltage relay VR1 in series with this resistor R2 and the resistor R1 to make the armature drop out at a lower value of generator voltage than before in order to cause a smooth backward transition of the motor connections from the parallel-shunt to the parallel relation which occurs upon a decrease in the speed and voltage of the motors and an increase in the load current in the motors.

Backward transition between the parallel and series-parallel relation takes place upon a further decrease in the motor speed and an increase in the motor current in the winding of the current relay IR to cause pickup of the relay armature and the opening of the contacts thereof. The opening of the contacts of the relay IR opens the previously mentioned holding circuit connections PC, 95, 97, 99 and NC for the winding of the parallel relay PR and its armature drops out and opens the upper two and lower two sets of contacts and closes the two intermediate sets of contacts, as illustrated in the drawing. Opening of the lower set of contacts of the relay PR opens the circuit connections PC, 61, 63, 66, 31, 33 and NC to the winding of the shunt field relay SHR and its armature drops to deenergize the winding of the battery field relay BFR to again cause discharge of the generator shunt and battery field windings SH and BF in order to promptly reduce the generator output to the motors. Opening of the contacts of the relay PR, second from the bottom, opens the circuit connection PC, 37, 39, 41 and 35 to the windings of the parallel contactors P1 and P4 and also opens the circuit connections 39, 45, 47 and 43 to the windings of the parallel contactors P2 and P3 and the armatures of all these parallel contactors drop to the normal position shown. Closure of the contacts, third and fourth from the top, of the parallel relay PR and closure of the bottom interlocking contacts of the parallel relays P1 and P4 upon drop-out of the armatures thereof causes energization of the windings and pickup of the armatures of the series contactors S14 and S23 to connect the motors in series-parallel relation with the generator G. Closure of the fourth contacts from the top of the parallel relay PR and the bottom interlocking contacts of the contactor P3 and also closure of the interlocking contacts directly below the power contacts of the series contactors S14 and S13 again causes energization of the windings and pickup of the armatures of the shunt and battery field contactors SHR and BFR to re-excite the generator shunt and battery field windings SH and BF and apply power to the series-parallel connected motors M1, M2, M3 and M4. The resulting rise in generator voltage will again cause energization of the windings and pickup of the armature of the voltage relay VR1 to again cause energization of the winding and pickup of the armature of the motor field shunting contactor M and cause forward transition of the motor connections from the series-parallel motor connection arrangement to the series-parallel-shunt arrangement.

Backward transition from series-parallel-shunt to series-parallel arrangement takes place upon a further decrease in the generator voltage to cause the lower voltage drop-out of the armature of the voltage relay VR1, as now the portion of the resistor R2 is not shunted. This again causes drop-out of the motor field shunting contactor M to cut out the motor field shunting resistors and establish the series-parallel motor connection.

In order to stop the locomotive, the handle H of the master controller MC is moved back to the stop position to reduce the speed and power output of the generator to the minimum or idle value and to deenergize the windings and cause dropout of the series contactors S14 and S23 to disconnect the motors from the generator.

The above described traction and control system including two voltage relays and a current relay provides a simple control circuit for causing smooth automatic transition of the motor connections on locomotives of the generating electric type.

I claim:

1. In a locomotive traction and control system, a prime mover, an electric generator driven thereby and having a field winding, discharging means for the generator field winding, locomotive traction motors, each having a field winding, shunting means for the motor field windings, power connections including switching means for connecting the motors in series and parallel power driving circuit relation with the generator, first and second automatic control means connected to the generator and acting in sequence during successively higher ranges in generator voltage, control connections interconnecting the first and second automatic control means with the shunting, discharging and switching means, said switching means discontinuing discharge of the generator field by the discharging means upon completion of each motor connection, said first control means causing motor field shunting by the field shunting means for each motor connection and said second control means causing discharge of said generator field winding to discontinue action of the second and the first control means, in the order mentioned, to cause a change in the motor connections from series with motor fields shunted to parallel after discharge of the generator field by the discharging, shunting and switching means.

2. In a locomotive traction and control system, a prime mover, an electric generator driven thereby having a field winding, discharging means for the generator field winding, locomotive traction motors each having a field winding, shunting means for the motor field windings, power connections including switching means for connecting the motors in series and parallel power driving circuit relations with the generator, first and second automatic control means connected to the generator, control connections interconnecting said first and second control means with the discharging, shunting and switching means, said switching means discontinuing discharge of the generator field by the discharging means upon completion of each motor connection, said first control means acting during a preselected range in generator voltage to cause shunting of the motor field windings by the shunting means for each motor connection, said second control means acting upon an increase in generator current to cause discharge of the generator field and change the motor connections from series to parallel by the discharging and switching means.

3. In a locomotive traction and control system, a prime mover, an electric generator driven thereby and having a field winding, discharging means for the generator field winding, locomotive traction motors, each having a field winding, shunting means for the motor field windings, power connections including switching means for connecting the motors in series and parallel power driving circuit with the generator, first, second and third automatic control means connected to the generator, control connections interconnecting each of said automatic control means with the discharging, shunting and switching means, said switching means discontinuing discharge of the generator field upon completion of each motor connection, said first and second control means acting to cause shunting of the motor field windings by the shunting means during a preselected range in generator voltage for each motor connection, said second control means acting during a higher preselected range in generator voltage for the series motor connection to cause discharge of the generator field by the discharging means to promptly reduce the generator voltage to a low value and discontinue action of said second and first control means in the order named, to then cause a change from the series motor connection with the motor fields shunted to the parallel connection and said third control means acting upon a preselected generator current to cause discharge of the generator field and cause a change from the parallel to the series motor connection by the discharging and switching means.

4. In a locomotive traction and control system, a prime mover having a speed responsive governor, speed response setting means for the governor to control the engine speed, an electric generator driven by the engine and having a field winding, discharging means for the generator field winding, locomotive traction motors, each having a series field winding, shunting means for the motor field windings, power connections including switching means for connecting the motors in series and parallel power driving circuit relations with the generator, manual control means, first, second and third automatic control means connected to the generator, control connections interconnecting each of said control means with the speed response setting, discharging, shunting and switching means, said manual control means causing an increase in the engine speed and completion of the series motor connection to cause starting of the locomotive by the speed response setting and switching means, said switching means discontinuing discharge of the generator field winding by the discharging means for each motor connection to cause operation of the locomotive, said first automatic control means acting during a preselected range in generator voltage to cause shunting of the motor field windings by the shunting means for each motor connection, said second automatic control means acting during a higher range in generator voltage with the motors connected in series with the motor field windings shunted to cause discharge of the generator field winding by the discharging means and thereby promptly reducing the generator voltage to a low value to discontinue action of said second and first control means in the order named in order to cause a change in the motor connections from the series connection with the motor fields shunted to the parallel connection, said third control means acting upon a preselected value of motor current with the motors connected in parallel to cause discharge of the generator field and a change from the parallel to the series motor connection by the discharging and switching means.

5. In a locomotive traction and control system, a prime mover having speed responsive control means, speed response setting means for the speed responsive means, an electric generator driven by the prime mover and having a field winding, a field rheostat connected to the generator field winding and operable by the speed responsive control means to control the generator output, discharging means for the generator field winding, a plurality of traction motors, each having a field winding, power connections including connection changing means for connecting the motors in series-parallel and parallel power driving circuit relations with the generator, field shunting means for the motor fields for connecting the motors in series-parallel-shunt and parallel-shunt power driving circuit relations with the generator, a manual controller, first, second and third automatic control means connected to the generator, control and interlocking connections interconnecting each of the control means, the controller, the speed response setting, discharging, connection changing and shunting means, the manual controller causing an increase in the speed and power output to the prime mover and generator and completion of the series-parallel motor connection by the speed response setting and connection changing means, said connection changing means discontinuing discharge of the generator field by the discharging means upon completion of the series-parallel connection to start the locomotive and also discontinuing discharge of the generator field winding upon completion of the parallel connection to cause high speed operation of the locomotive, said first automatic control means acting during a preselected range of generator voltage to cause shunting of the motor fields by the shunting means to establish the series-parallel-shunt motor connection to increase the speed range of the locomotive, said second automatic means acting during a preselected higher range in generator voltage to cause discharge of the generator field winding and a prompt reduction in the generator voltage to a low value in order to discontinue action of said second and first automatic control means in the order named and thereby cause a change from the series-parallel-shunt to the parallel motor connection by the shunting and connection changing means and said third automatic control means acting upon a preselected value of generator current with the motors connected in parallel to cause discharge of the generator field winding and a change from the parallel to the series-parallel motor connection by the discharging and connection changing means.

6. In a locomotive traction and control system, a prime mover having speed responsive control means, speed response setting means for the speed responsive means, an electric generator driven by the prime mover and having at least one field winding, discharging means for the field winding, a field rheostat connected to the field winding and operable by the speed responsive means to control the generator output and load on the prime mover, a plurality of locomotive traction motors, each having a series field winding, power connections including connection changing means for connecting groups of motors in series and parallel relation with the generator to establish series-parallel starting and parallel running connections, shunting means for the motors to connect the motors in series-parallel-shunt and parallel-shunt higher speed speed relations, a manual controller, first, second and third automatic control means connected to the generator, said first automatic control means being connected by a resistor having taps to the generator, a control relay for the discharging and connecting changing means, control and interlocking connections interconnecting each of the control means, the controller, the response setting, discharging, connection changing, and shunting means and the control relay, the manual controller causing an increase in the speed and power output of the prime mover and generator and establishment of the series-parallel motor connection by the speed response setting, connection changing means and the control relay, the relay and connection changing means discontinuing discharge of the generator field winding by the discharging means to cause starting of the locomotive with the motors connected in series-parallel and also causing discharging when the motors are connected in parallel, said first automatic control means acting during a preselected range in generator voltage to cause shunting of the motor field windings and completion of a higher speed series-parallel-shunt motor connection by the shunting means, said second automatic control means acting during a preselected higher range in generator voltage with the motors connected in series-parallel-shunt to cause discharge of the generator field winding by the control relay and discharging means and thereby cause a prompt reduction in generator voltage to discontinue action of said second and first automatic control means, in the order named, and thereby cause a change from the series-parallel-shunt to the parallel motor connection by the connection changing means and relay, said first control means acting again to cause establishment of the parallel-shunt motor connection by the shunting means, said shunting and said connection changing means causing shunting of the taps of the resistor for said first automatic control means to increase the range of voltage actuation thereof for the parallel-shunt motor connection and said third automatic control means acting upon a preselected value of generator current with the motors connected in parallel to cause discharge of the generator field and a change from the parallel to the series motor connection by the control relay and connection changing means.

7. In a locomotive traction and control system and engine, a governor driven thereby, governor setting means, an electric generator driven thereby having at least one field winding, a generator field rheostat operable by the governor to vary the engine and generator speed, load and output, discharging means for the generator field, a plurality of electric traction motors each having a series field, power connections including switching means for connecting the motors in series-parallel and parallel power driving relation with the generator, motor field shunting means for connecting the motors in series-parallel-shunt and parallel-shunt power driving circuit relation with the generator, a manually operable master controller, first, second and third automatic control means connected to the generator, control and interlocking connections interconnecting the master controller, each automatic control means and the governor setting, discharging, switching and shunting means, said first automatic control means acting during a preselected range in generator voltage to cause establishment of the series-parallel-shunt and parallel shunt motor connections, said second automatic control means acting during a higher range in generator voltage to cause discharge of the generator field by the discharging means and a prompt reduction in the generator voltage to a low value to discontinue action of the second and first automatic means in the order named and cause a change from the series-parallel shunt to the parallel connection, said third automatic control means acting upon a preselected value of generator current to cause change from the parallel back to the series-parallel motor connection and train-line control connections including a connector and connected to the master controller, governor setting and switching means for connection to similar means on other locomotivses for multiple control thereof from a master controller.

LAUREN L. JOHNSON.

REFERENCES CITED

The following references are of record in the file of this patent:

UNITED STATES PATENTS

| Number | Name | Date |
|---|---|---|
| 2,365,418 | Lillquist | Dec. 19, 1944 |
| 2,449,399 | Lillquist | Sept. 14, 1948 |